(12) United States Patent
Mei

(10) Patent No.: US 11,201,543 B2
(45) Date of Patent: Dec. 14, 2021

(54) METHODS AND APPARATUS TO IMPROVE THE SAFE OPERATING AREA OF SWITCHED MODE POWER SUPPLIES

(71) Applicant: Texas Instruments Incorporated, Dallas, TX (US)

(72) Inventor: Tawen Mei, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/178,552

(22) Filed: Nov. 1, 2018

(65) Prior Publication Data

US 2020/0144915 A1 May 7, 2020

(51) Int. Cl.
| | |
|---|---|
| *H02M 3/156* | (2006.01) |
| *H02M 3/158* | (2006.01) |
| *H02M 1/00* | (2006.01) |
| *H02M 1/32* | (2007.01) |

(52) U.S. Cl.
CPC ........... *H02M 3/158* (2013.01); *H02M 3/156* (2013.01); *H02M 1/0009* (2021.05); *H02M 1/0038* (2021.05); *H02M 1/327* (2021.05)

(58) Field of Classification Search
CPC .................. H02M 3/155; H02M 3/157; H02M 2001/0009; H02M 2001/0016; H02M 2001/0019; H02M 2001/0025; H02M 2001/0038; H02M 2001/327
USPC ......... 323/234, 271, 282–285, 311–313, 351
See application file for complete search history.

(56) References Cited

U.S. PATENT DOCUMENTS

| | | | | |
|---|---|---|---|---|
| 6,188,211 | B1* | 2/2001 | Rincon-Mora | ......... G05F 1/575 323/273 |
| 6,285,246 | B1* | 9/2001 | Basu | ....................... G05F 1/575 323/316 |
| 9,046,905 | B2* | 6/2015 | Qin | .......................... G05F 1/10 |
| 9,791,480 | B2* | 10/2017 | Qin | ..................... G01R 19/0092 |
| 10,348,185 | B1* | 7/2019 | Michal | ............. H02M 3/33507 |
| 2003/0107358 | A1* | 6/2003 | Isham | ................... H02M 3/156 323/283 |
| 2003/0111984 | A1* | 6/2003 | Isham | .................... G01R 31/40 323/271 |
| 2003/0122529 | A1* | 7/2003 | Lee | ......................... G05F 1/569 323/276 |
| 2005/0057228 | A1* | 3/2005 | Shih | ....................... H02M 1/38 323/222 |
| 2005/0185490 | A1* | 8/2005 | Zhang | .................... G05F 1/575 365/205 |

(Continued)

FOREIGN PATENT DOCUMENTS

JP      5612024 B2    10/2014

OTHER PUBLICATIONS

PCT Search Report for Application No. PCT/US 2019/059309, dated Jan. 30, 2020.

*Primary Examiner* — Thienvu V Tran
*Assistant Examiner* — Ivan Laboy
(74) *Attorney, Agent, or Firm* — Mark Allen Valetti; Charles A. Brill; Frank D. Cimino

(57) ABSTRACT

A system includes a current mirror coupled to a first transistor, the first transistor includes a first gate, a first current terminal, and a second current terminal, a controller coupled to the current mirror and a converter, the controller is to output a delayed signal for a second transistor, the second transistor being a part of the converter, and a source voltage coupled to the current mirror.

15 Claims, 8 Drawing Sheets

(56) References Cited

U.S. PATENT DOCUMENTS

| | | | | |
|---|---|---|---|---|
| 2006/0255774 | A1* | 11/2006 | Motomori | H02M 3/1588 323/224 |
| 2007/0194768 | A1* | 8/2007 | Bansal | G05F 1/573 323/277 |
| 2008/0024098 | A1* | 1/2008 | Hojo | H02M 3/156 323/282 |
| 2008/0088283 | A1* | 4/2008 | Ruobiao | H02M 3/1588 323/271 |
| 2009/0051338 | A1* | 2/2009 | Wang | H02M 3/156 323/285 |
| 2010/0013451 | A1 | 1/2010 | Nakamura et al. | |
| 2010/0079127 | A1* | 4/2010 | Grant | H02M 3/156 323/285 |
| 2014/0253070 | A1* | 9/2014 | Sakaguchi | G05F 1/573 323/273 |
| 2015/0084613 | A1* | 3/2015 | Ho | H02M 3/1588 323/299 |
| 2015/0171737 | A1* | 6/2015 | Pagano | G01R 19/0092 323/284 |

* cited by examiner

US 11,201,543 B2

1

METHODS AND APPARATUS TO IMPROVE THE SAFE OPERATING AREA OF SWITCHED MODE POWER SUPPLIES

FIELD OF THE DISCLOSURE

This disclosure relates generally to improving operating conditions, and, more particularly, to methods and apparatus to improve the safe operating area of switched mode power supplies.

BACKGROUND

Power converters are circuits used in various devices to convert an input voltage to a desired output voltage. One type of power converter is a buck converter, which converts a direct current (DC) input voltage into a lower DC output voltage by controlling transistors and/or switches to charge and/or discharge inductors and/or capacitors. Power converters may include one or more power switches, such as transistors, that may be used to control current paths in the power converters. Power converter components are subject to high temperatures, high currents, high voltage, and high power.

SUMMARY

An example system includes a current mirror coupled to a first transistor. The first transistor includes a first gate, a first current terminal, and a second current terminal. The example system further including a controller coupled to the current mirror and a converter; the controller is to output a delayed signal for a second transistor, the second transistor being a part of the converter, and a source voltage coupled to the current mirror.

2

Figure 1A:
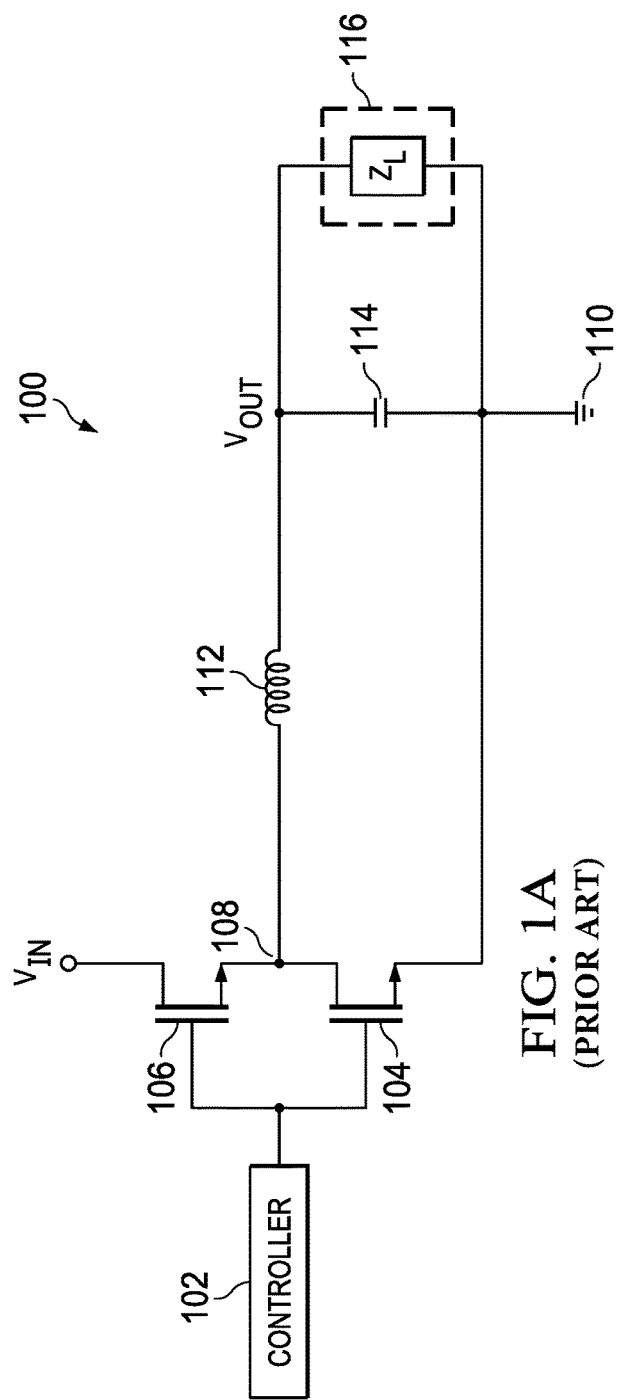
FIG. 1A is a schematic of a switched mode power converter.

The figures are not to scale. In general, the same reference numbers will be used throughout the drawing(s) and accompanying written description to refer to the same or like parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Power converters, herein referred to as switched mode power supplies, converters, power converters, or power switching circuits, are used in applications that may benefit from a reliable power source. A power converter may be a step-up converter (e.g., a boost converter that creates an output voltage greater than the input voltage), a step-down converter (e.g., a buck converter that creates an output voltage less than the input voltage), or a combination of the above. Although examples disclosed herein include improving the safe operating area (SOA) of a step-down converter (e.g., a buck converter that creates an output voltage less than the input voltage), the features as described in the present disclosure and their attendant advantages are not limited to step-down converters. In fact, the features and advantages described herein apply also to step-up converters.

Typically, power converters operate under several design constraints (e.g., current limits and/or voltage limits). A safe operating area of a power converter is referred to as the voltage and/or current conditions in which the device (e.g., power converter) is expected to operate without self-damage. Techniques to maintain the safe operating area of a power converter are practiced for protecting the converter, components in the converter (e.g., transistors, inductors, capacitors), and/or the system (e.g., the load or application in which the converter is used).

In order for a power converter to be an efficient and reliable power source, the current or currents flowing through various parts of the power converter circuit (e.g., the inductor current, transistor current, load current, etc.) are regulated by a controller. Additionally, a power converter usually includes at least one switch (e.g., a transistor) and a controller to turn the switch on and/or off. The controller monitors these currents to regulate the output voltage, thus providing a reliable power source. For example, a controller regulates the load current, which is achieved through regulating the inductor current, to ensure the output voltage is within the desired range. The controller regulates the inductor current by varying the operation of the transistors. The controller varies the operation of the transistors to either increase or decrease the inductor current depending on the desired operating constraints.

In two transistor or four transistor buck converters, during low-side operation (e.g., when one or more of the low-side transistors are conducting), the load current is proportional to the voltage across the low-side transistor(s). In an example buck converter, the load current can be determined by measuring the voltage across the low-side transistor. Further, during low-side operation in a buck converter, the low-side transistor is effectively in series with the inductor, thus the low-side transistor current is equivalent to the inductor current. Therefore, the current through the low-side transistor is monitored through measuring the voltage across the low-side transistor.

Examples of power converter switches (e.g., transistors), as disclosed herein, include transistors such as metal-oxide-semiconductor field-effect-transistors (MOSFET's), or any other switching devices such as a bipolar junction transistors (BJT's). Other switch types or technologies may be used. Power converter transistors (e.g., MOSFET's, BJT's, etc.) have inherent parasitic body diodes. Under normal operating conditions (e.g., standard operating temperature conditions), the parasitic body diodes carry minimal current. Furthermore, under normal operations conditions, the parasitic body diode current is negligible when monitoring the inductor current.

As temperatures increase in the transistor, the drain-to-source resistance ($R_{DS}$ or $R_{ON}$) of the transistor increases, thus causing the parasitic body diodes to conduct more current. Therefore, the ability to accurately sense current and/or voltage through the low-side transistor is lost, which ultimately diminishes the controller's ability to accurately sense load current and leads to thermal run-away. Thermal run-away is a condition that occurs when the valley current (e.g., current the inductor discharges during low-side operation) of the inductor is no longer properly sensed. An increase in parasitic body diode current causes the inductor current to no longer fall below the current limit value (e.g., minimum desired current value or valley current limit). As a result, the high-side transistor turns on before the inductor current reaches the valley current (e.g., because of an increase in parasitic diode current). Additionally, as the parasitic body diodes carry increasing current, the susceptibility to avalanche breakdown increases. As a result of the continued increase in temperature, impact ionization in the device may generate enough current to keep the parasitic diode on, thus leading to device failure.

Examples disclosed herein include the ability to account for thermal run-away caused by an increase in temperature. The examples disclosed herein include monitoring the low-side transistor voltage while the low-side transistor is operating. The example further includes the ability to detect if the parasitic body diodes in the low-side transistor are carrying significant current. The determination of whether the parasitic body diodes are carrying significant current can be inferred by detecting the voltage across the low-side transistor.

In the example disclosed herein, the low-side transistor current is calculated using the voltage across the low-side transistor, the resistance of the transistor (e.g., transistor drain-to-source resistance, $R_{DS}$ or $R_{ON}$), and Ohm's Law. The voltage across the low-side transistor is measured across the low-side transistor with respect to another voltage reference (e.g., ground). During periods of increased temperature, the $R_{DS}$ value of the example low-side transistor varies, thus producing an inaccurate voltage measurement.

Examples disclosed herein allow for the ability to detect if significant current is traveling through the parasitic body diodes of the low-side transistor. Significant current traveling through the parasitic body diodes of the low-side transistor indicates the low-side transistor(s) and/or high-side transistor(s) is/are switching on and/or off too quickly. If the high-side transistor(s) and/or the low-side transistor(s) are switching on and/or off too quickly, the switching frequency (e.g., frequency at which the transistors turn on and/or off) can be adjusted. Examples disclosed herein include folding back (e.g., reducing) the switching frequency of the high-side transistor(s) and/or low-side transistor(s) until the inductor valley current reaches the valley current limit.

Examples disclosed herein include circuits and systems for folding back the switching frequency to reduce the switching speed of a transistor. Folding back the frequency includes generating a "fold-back signal" representative of body diode current conduction. The fold-back signal is sent to the controller of the converter. This signal may indicate whether to slow down the operation of the converter by suspending and/or halting the clock or maintain the current operation of the converter. More specifically, the clock that controls the turn on time of the transistor may be altered in a manner such as delaying, to turn on the transistor at varying times.

Examples disclosed herein include determining if the parasitic body diodes of a low-side transistor are conducting significant current. Examples further include determining if the parasitic body diodes carry significant current through measuring the voltage across the low-side transistor. Through measuring the voltage across the low-side transistor, a determination of whether to fold-back the transistor operations occurs (e.g., reducing the switching frequency of the power converter). In folding back the switching frequency of the power converter, the inductor has more time to reach the valley current limit when discharging, thus avoiding thermal run-away.

FIG. 1A is a schematic of a switched mode power converter 100 that is coupled to a controller 102. The converter 100 includes two transistors (low-side transistor 104 and high-side transistor 106). The low-side transistor 104 and high-side transistor 106 are n-channel metal-oxide-semiconductor field effect transistors (NMOS). The gate terminals of the low-side transistor 104 and high-side transistor 106 are coupled to a controller 102. The drain terminal of the high-side transistor 106 is coupled to a voltage input ($V_{IN}$). The source terminal of the high-side transistor 106 is coupled to the drain terminal of the low-side transistor 104. The transistor node 108 is the node coupled to the source terminal of the high-side transistor 106 and the drain terminal of the low-side transistor 104. Furthermore, the source terminal of the low-side transistor 104 is coupled to a ground node 110. Additionally, an inductor 112 is coupled to the transistor node 108. A capacitor 114 is coupled in series with the inductor 112 and the ground node 110. Additionally, a load 116 (e.g., automobile electronic device, industrial end equipment, etc.) is parallel-coupled to the capacitor 114.

The example controller 102 is used to regulate certain values in the example converter 100. The controller 102 regulates the load voltage. Additional examples include regulating the load voltage to maintain a maximum allowable voltage or a minimum allowable voltage, regulating the load current, or limiting the maximum positive current and/or minimum negative current of the inductor 112 to avoid damage to the load 116, converter 100 or system (e.g., the converter and/or load connected to the converter). Additionally, the controller 102 controls the states (e.g., conducting or not conducting) of the high-side transistor 106 and the low-side transistor 104. The controller 102 may be implemented using a microcontroller, discrete components, or any other suitable form. Further, in the example converter 100, a voltage reference point is provided by the ground node 110. The ground node 110 may be earth ground, digital ground, analog ground, or any other voltage value to serve as a reference.

The example low-side transistor 104 is an n-channel metal-oxide-semiconductor field-effect transistor (NMOS). Alternatively, the low-side transistor 104 may be a p-channel metal-oxide-semiconductor field-effect transistor (PMOS), bipolar junction transistor (BJT), or any other three terminal device.

The example high-side transistor 106 is an n-channel metal-oxide-semiconductor field-effect transistor (NMOS). Alternatively, the high-side transistor 106 may be a p-channel metal-oxide-semiconductor field-effect transistor (PMOS), bipolar junction transistor (BJT), or any other three terminal device.

The example transistor node 108 is coupled to the source terminal of the high-side transistor 106 and the drain terminal of the low-side transistor 104. Additionally, the transistor node 108 is coupled to the inductor 112. The transistor node 108 provides reference for the inductor 112 current and/or high-side transistor 106 or low-side transistor 104 voltage.

The example ground node 110 provides a reference voltage for the power converter. In some examples, the ground node 110 is earth ground, digital ground, or analog ground. Other examples include an additional voltage value and/or source at the ground node 110. In this example, the additional voltage value and/or source provides a reference voltage for the power converter.

The example inductor 112 is a two terminal electrical component that stores energy in a magnetic field when current flows through it. During high side operation, when the high-side transistor 106 is conducting and the low-side transistor 104 is not, energy is stored in the inductor 112. During low side operation, when the low-side transistor 104 is conducting and the high-side transistor 106 is not, energy is being discharged from the inductor 112.

The example capacitor 114 is a two terminal electrical component that stores energy in an electric field. During high side operation, when the high-side transistor 106 is conducting and the low-side transistor 104 is not, energy is being stored in the capacitor 114. On the other hand, during low side operation (e.g., the low-side transistor 104 is conducting) energy is discharged from the capacitor 114.

The example load 116 is a component of the circuit that consumes electrical power. The load 116 includes, but not limited to, capacitive loads, inductive loads, resistive loads, or any combination set forth herein. In other examples disclosed herein, the load 116 directly corresponds to a load of automobile application, industrial sector end equipment and/or consumer electronics. For example, the load 116 may include interior lights in an automobile, electrical relays in an automobile, a cellular phone, industrial equipment such as a machine press, etc.

Figure 1B:
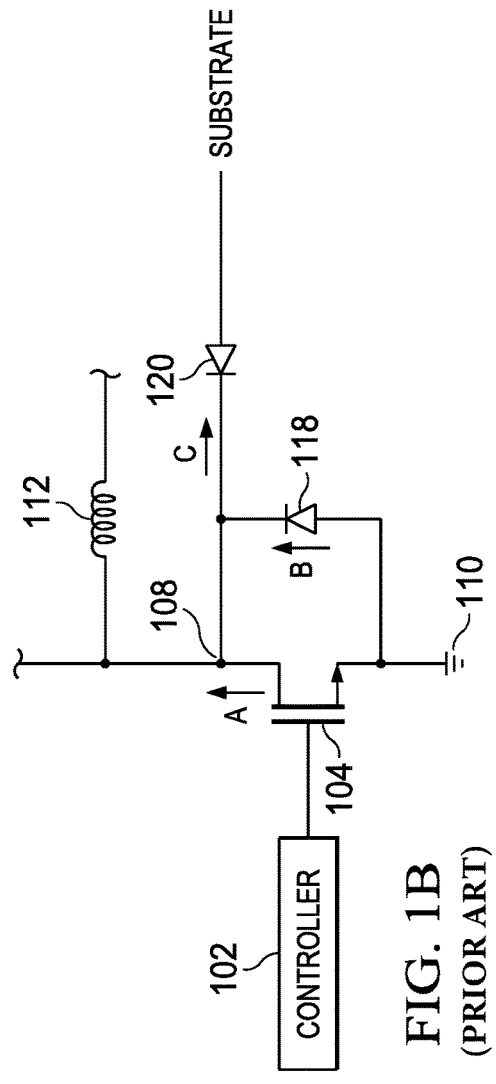
FIG. 1B is a schematic of a known transistor and showing transistor parasitic components.

FIG. 1B is a schematic showing the low-side transistor 104 and transistor parasitic components 118, 120 that result from device materials and manufacturing processes. One of the parasitic components 118 is a parasitic body diode 118 and the other parasitic component 120 is a drain-to-substrate diode 120. In this example, the substrate may be silicon, gallium arsenide, etc.

As shown in FIG. 1B, three current paths exist within the low-side transistor 104. The first current path is through the transistor channel, shown as Current A. Current A is the desired current though the low-side transistor 104. The second current path is through the parasitic body diode 118, shown as Current B. Current B is a parasitic current that decreases ability to sense the channel current, Current A, because Current B bypasses the channel. The third current path flows through the parasitic drain-to-substrate diode 120, shown as Current C.

Ideally, when sensing current through a transistor, there is a linear relationship between the channel current (Current A) and drain-to-source resistance ($R_{DS}$ or $R_{ON}$). When sensing current, the channel current, Current A, is assumed to be linearly proportional to the low-side transistor 104 current. As temperatures increase, the transistor resistance between the drain and source ($R_{DS}$ or $R_{ON}$) also increases. When transistor drain-to-source resistance ($R_{DS}$ or $R_{ON}$) increases, the parasitic diodes 118, 120 carry an increase in current. The parasitic components 118, 120 carrying significant current lead to the inability to properly sense the channel current, current A.

Figure 2A:
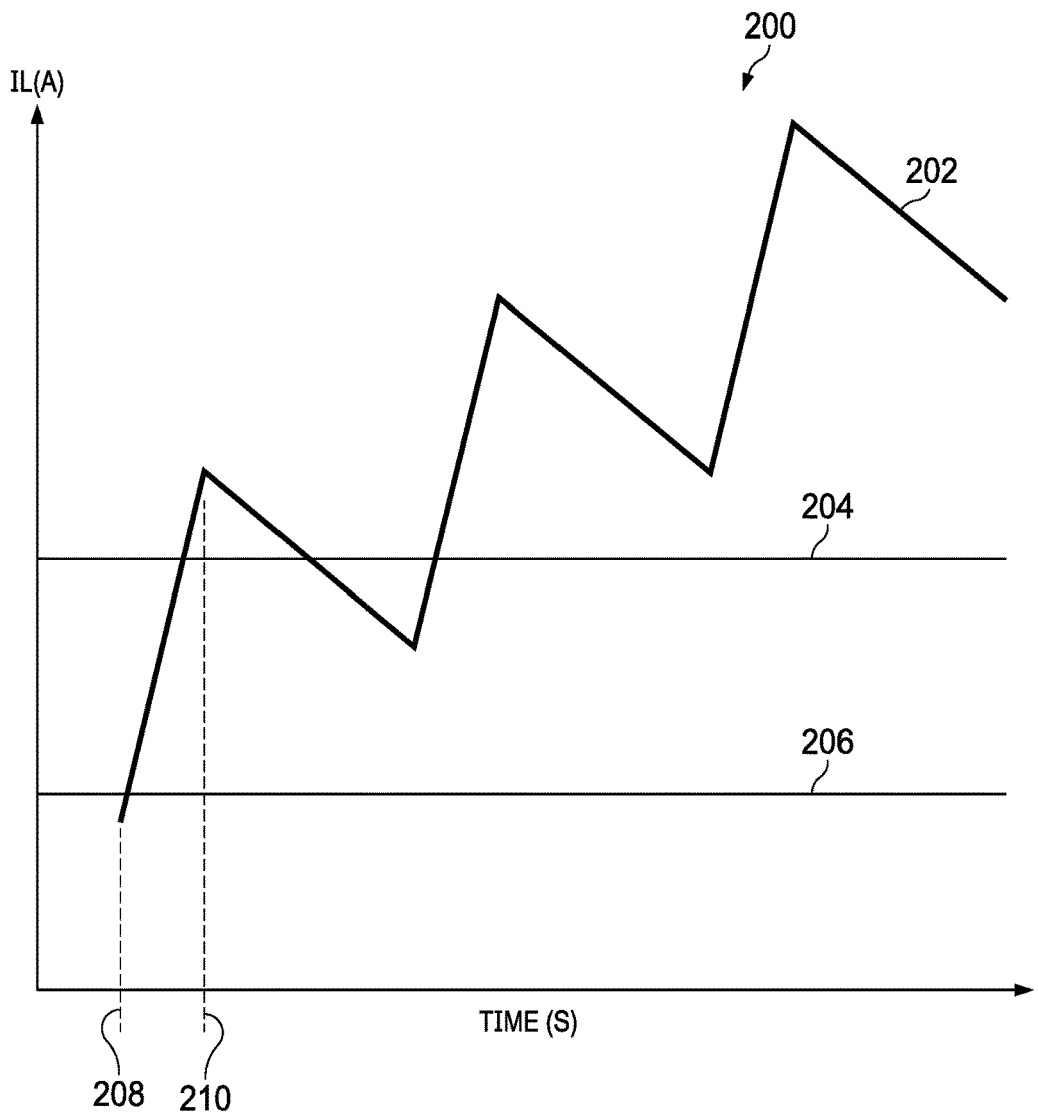
FIG. 2A is a graphical illustration of inductor current versus time in a switched mode power supply during high temperatures.

FIG. 2A is a graphical illustration 200 of inductor current versus time in a switched mode power supply during high temperatures. Line 204 depicts the desired high-side inductor current limit. Likewise, line 206 depicts the desired low-side inductor current limit. As a result of high temperatures and increased transistor drain-to-source resistance ($R_{DS}$ or $R_{ON}$), more and more inductor current is carried (e.g., flows through) the parasitic diodes (118, 120 of FIG. 1). The ability to sense valley current (e.g., low-side inductor current) is compromised due to the parasitic diodes (118, 120 of FIG. 1) carrying significant current that the inductor (112 of FIG. 1) should be carrying. The inductor current 202 begins to run away from a stable state (e.g., maintain within the high-side inductor current limit, shown as Line 204, and the low-side inductor current limit, shown as Line 206). Clearly depicted, as time increases and temperature also increases, the inductor current 202 no longer reaches the low-side current limit because of the compromised ability to sense the inductor valley current, thus the inductor current 202 begins to run away.

At time 208, the high-side transistor 106 turns on. During this time, the inductor 112 stores energy in a magnetic field. The inductor current 202 increases. At time 210, the high-side transistor 106 turns off. After the high-side transistor 106 turns off, at time 210, the low-side transistor 104 is turned on and the energy stored in the inductor is dissipated through the inductor. Since there is an increase in temperature, the parasitic diodes 118, 120 carry significant current. The ability of the inductor current, 202, to reach the low-side current limit, line 206, (e.g., valley current limit) is compromised. The controller 102 will command the high-side transistor 106 to turn on before the inductor current is fully discharged to the low-side current limit, line 206 (e.g., valley current limit).

Figure 2C:
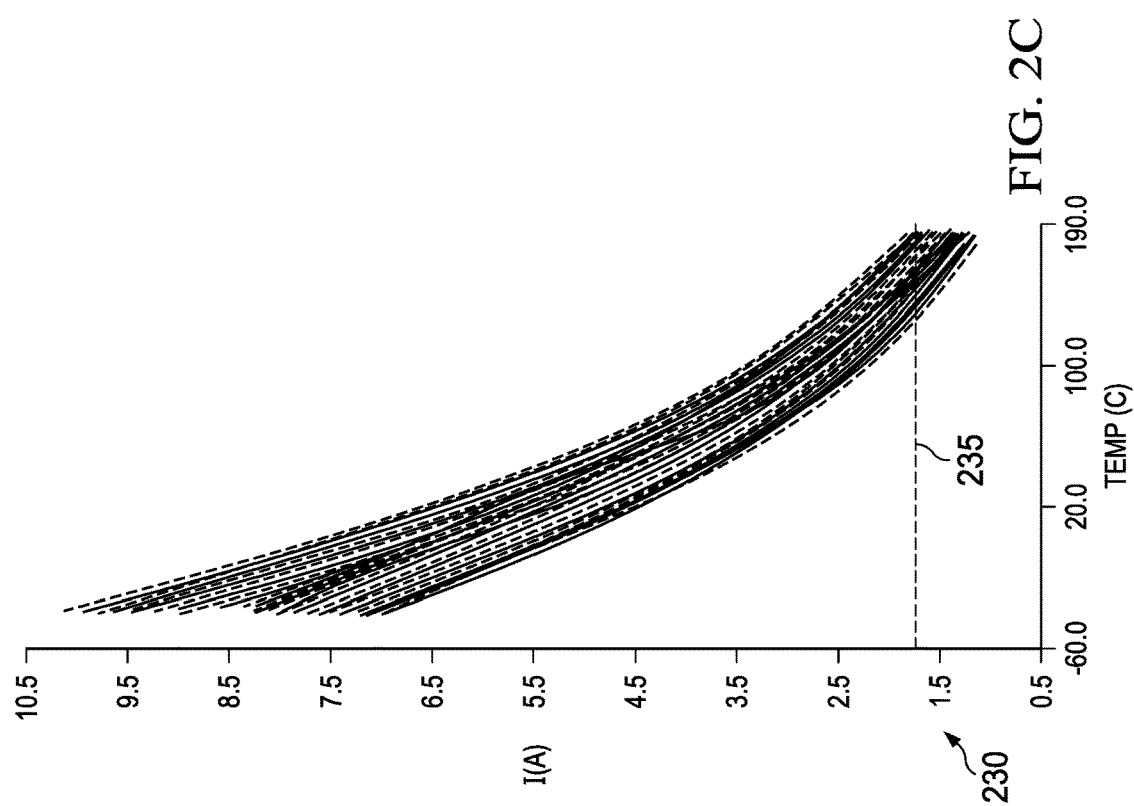
FIG. 2C is a graphical illustration of inductor conduction currents versus temperature.
Figure 2B:
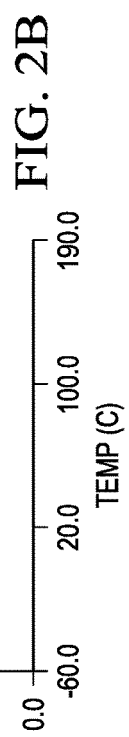
FIG. 2B is a graphical illustration of diode conduction currents versus temperature.

FIG. 2B is a graphical illustration of parasitic diode conduction currents versus temperature after accounting for parasitic currents (Current B and Current C). The varying current lines in FIG. 2B depict parasitic body diode current (Current B and Current C), in different voltage conditions. In FIG. 2B, the switching speed of the power converter 100 is reduced (e.g., a delay was implemented) to adjust for the parasitic body diodes (118, 120) conducting significant current (Current B and Current C). The illustration 220 in FIG. 2B shows the parasitic diode currents (Current B and Current C) are maintained to no longer carry significant current. In FIG. 2B, the switching speed of the power converter is reduced to adjust for the parasitic body diodes conducing significant current. The parasitic body diode 118 and parasitic drain-to-substrate diode 120 are limited to 3.5 milliamperes (mA) of current, regardless of temperature, line 225. Other examples include limiting the parasitic body diode 118 and parasitic drain-to-substrate diode 120 current to any other current value (e.g., 2 mA, 2.5 mA, etc.).

FIG. 2C is a graphical illustration 230 of inductor conduction currents as temperature increases after accounting for parasitic currents (Current B and Current C). The depiction in FIG. 2C is a depiction of inductor current (Current A) during low-side operation for varying voltage scenarios. In FIG. 2C, the switching speed of the power converter 100 is reduced (e.g., a delay was implemented) to adjust for the parasitic body diodes 118, 120 conducting significant current (Current B and Current C). Clearly shown in FIG. 2C is the ability for the inductor 112 to discharge enough current during low-side operation to reach the example valley current limit, shown as line 235, regardless of temperature.

Figure 3:
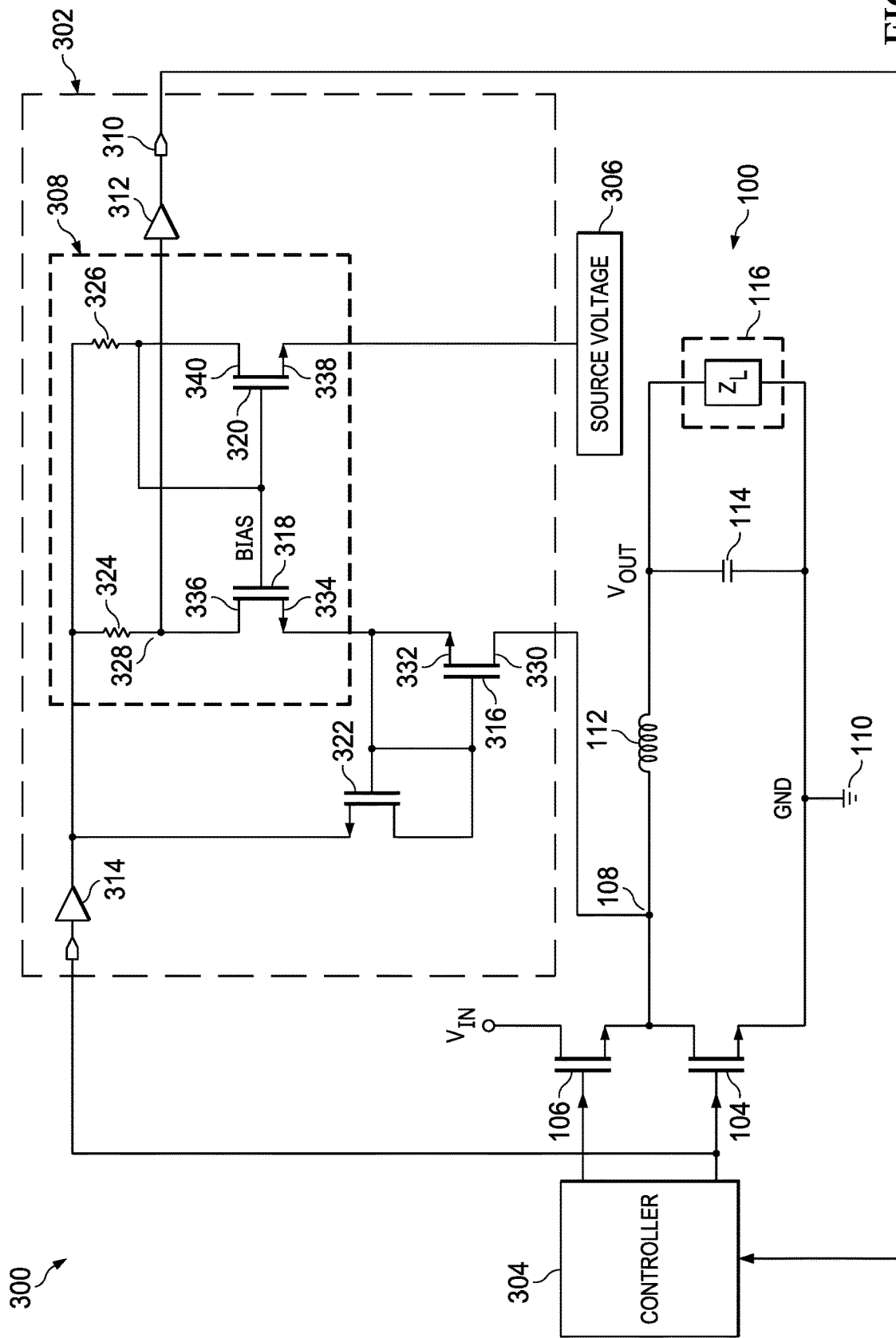
FIG. 3 is a schematic illustrating a power converter and an example fold-back circuit.

FIG. 3 is a schematic of a system 300 including an example fold-back circuit 302 coupled to the converter 100 of FIG. 1, an example controller 304, and an example source voltage 306. The example depicted in FIG. 3 includes the converter 100 such, as a monolithic step-down converter (e.g., buck converter). Examples disclosed herein are not limited to step-down converters. Other examples may include a converter such as a buck-boost converter, fly back converter, etc.

The example fold-back circuit 302 is coupled to the transistor node 108 of the converter 100. The fold-back circuit 302 determines if the parasitic diodes, 118, 120 of FIG. 1, are carrying significant current. If the parasitic diodes 118, 120 are carrying significant current, the magnitude of the voltage at the transistor node 108 will be abnormally high. When the magnitude of the voltage at the transistor node 108 exceeds a threshold in the fold-back circuit 302, the fold-back circuit 302 creates a fold-back signal 310. The threshold may be predetermined to be any voltage value. The threshold may be set by the source voltage 306 and/or as a voltage drop across the resistor 326. The fold-back signal 310 signifies the inductor 112 is not fully discharging (e.g., the inductor current is not reaching the valley current limit). In this example, the switching frequency of the converter 100 may be reduced (e.g., the controller 304 may slow down the switching speed of the high-side transistor 106 and/or the low-side transistor 104).

The example controller 304 receives the fold-back signal 310 from the fold-back circuit 302. The controller 304 may implement a delay for the converter 100 in order to adjust for rising inductor current and/or lost capability to properly sense the inductor current during low-side operation. The delay implemented by the controller 304 is a delay in turning on and/or off the low-side transistor 104 and/or the high-side transistor 106. If a delay is to be implemented, the controller 304 outputs a delayed signal (e.g., turn on and/or off signal) for the low-side transistor 104 and/or the high side transistor. The controller 304 implements the delay by delaying the enable signal (e.g., turn on signal) for the low-side transistor 104 and/or the high-side transistor 106. The delay may also be implemented by the controller 304 with a propagation delay, halting the clock (e.g., halting the turn on signal of the low-side transistor 104 and/or the high-side transistor 106), or any other method of initiating a delay.

The example source voltage 306 sets the current terminal 338 voltage for the transistor 320. Example values for the source voltage include 0.1 volts, 0.2 volts, etc.; however, the source voltage 306 value may change. Examples of the source voltage 306 include a battery, a power converter, or any other power supply.

The example fold-back circuit 302 includes two buffers 312 and 314, four transistors 316, 318, 320, and 322, and two resistors 324 and 326. In one of the examples disclosed herein, the four transistors 316, 318, 320, and 322 include at least two current terminals (e.g., a drain terminal and a source terminal) and one gate. The fold-back circuit 302 is not limited to the specific number of components disclosed herein.

In the example disclosed in FIG. 3, a current mirror 308 exists within the fold-back circuit 302. The current mirror 308 includes the example resistors 324 and 326, and the example transistors 318 and 320. Furthermore, the current mirror 308 ensures the current through the resistor 324 is mirrored to be equivalent to the current through the resistor 326. The output of the current mirror 308 is coupled to the buffer 312, to be further coupled to the controller 304. The current mirror 308 may generate an output signal that is a current and/or voltage value dependent on the operation of transistor 318. The output signal generated at the current mirror 308 output (e.g., fold-back signal node 328) is generated in response to a threshold. The threshold is exceeded when there exists a positive voltage drop across the gate of transistor 318 and the current terminal 334.

The example buffer 312 increases the available current. The buffer 312 may be implemented with discrete components, as an integrated chip, or any other method of implementing a buffer. The buffer 312 is coupled to the fold-back signal node 328, further coupled to the controller 304. The input of the buffer 312 is a high impedance input.

The example buffer 314 is coupled to the gate of the low-side transistor 104. The buffer 314 may be implemented with discrete components, as an integrated chip, or any other method of implementing a buffer.

Generally, the fold-back circuit 302 receives a voltage indicative of the low-side transistor voltage from the converter 100. The fold-back circuit 302 generates a fold-back signal 310 that is provided to the example controller 304. Other examples include the fold-back circuit 302 receiving any other metric, such as a current metric, indicative of the low-side transistor voltage from the converter 100. In the example of FIG. 3, the fold-back circuit 302 receives the voltage from the transistor node 108 of the converter 100. Though, in other examples, the voltage may be provided from other nodes or locations in the converter 100. The fold-back circuit 302 is also connected to the low-side transistor 104 gate. In this example, the fold-back circuit 302 receives the voltage indicative of the low-side transistor voltage from the transistor node 108. The fold-back circuit 302 generates a fold-back signal 310 in response to the voltage meeting a threshold. If the threshold is met, the fold-back circuit 302 generates and sends the fold-back signal 310 to the controller 304. In examples disclosed herein, the threshold value is a voltage and/or current value which sets the maximum current allowable through the inductor 112 and/or low-side transistor 104. The threshold value may be exceeded in conditions such as temperature increases, in which the converter 100 loses the ability to properly sense inductor 112 current. Additionally, the threshold may be a limit value representative of the desired voltage amount. The fold-back signal 310 indicates to the controller 304 to reduce the switching speed of the converter 100 (e.g., speed at which the low-side transistor 104 and/or high-side transistor 106 operate).

The example transistor 316 is a drain extension n-channel metal-oxide-semiconductor field-effect transistor that is able to withstand high voltage on the drain terminal. The current terminal 330 is coupled to the transistor node 108 of the converter 100. The example transistor 316 obtains the voltage representative of the voltage at the transistor node 108 in the converter 100. For example, during low side operation, the transistor 316 may obtain a voltage at the current terminal 330 equivalent to the following low-side transistor 104 voltage:

$$V_D = R_{ON} * I_L \qquad (1)$$

During low side operation (e.g., the low-side transistor 104 is conducting) the voltage at the transistor node 108 is negative. The negative voltage at the transistor node 108 during low side operations is due to the discharge of inductor current through the ground node 110, further through the low-side transistor 104, causing negative polarity. As a result, the transistor 316 obtains a negative voltage value at the current terminal 330. Other examples are not limited to receiving certain polarity voltages as the magnitude and polarity of voltages in a converter change frequently.

The voltage at the current terminal 332 of the transistor 316 is equivalent to the voltage at the transistor node 108 plus the voltage across the parasitic body diode of the transistor 316. Typical parasitic body diode voltage is 0.7 volts; however, the exact voltage is not limited to 0.7 volts. Examples in which the parasitic body diode voltage is not 0.7 volts include situations in which temperature changes thereby causing the voltage across the parasitic body diode to change. Likewise, the voltage at the current terminal 334 of the example transistor 318 will be equivalent to the voltage at the current terminal 332 of the transistor 316.

The example transistor 318 is an n-channel metal-oxide-semiconductor field-effect transistor. Additionally, the transistor 318 may be a bi-polar junction transistor, junction field-effect transistor (JFET), etc. The transistor 318 acts as a governing switch for the for the fold-back signal 310. When the transistor 318 is on (e.g., conducting), the fold-back signal 310 will be low. A low fold-back signal 310 is due to the current through the resistor 324 being pulled down through the transistor 318, thus making the fold-back signal 310 at the fold-back signal node 328 low, for example, 0.1 volts.

When the transistor 318 is off (e.g., not conducting), the fold-back signal 310 will be high. Additionally, when transistor 318 is off, the current flows through the resistor 324 to the high impedance buffer 312. In this manner, a relatively low voltage drop occurs across the resistor 324. Therefore, the voltage seen at the input of the high impedance buffer 312 is high (e.g., close to the voltage at the output of the buffer 314). In response, the fold-back signal 310 will be high.

The voltage at the gate of the transistor 318 is set by a bias value provided through the example transistor 320. The bias value may be a voltage and/or current provided. Examples disclosed herein include creating the bias value as a voltage over the example resistor 326; the voltage over the example resistor 326 is the voltage transferred by the buffer 314. The biasing value (e.g., biasing threshold) created over the resistor 326 creates a threshold for the transistor 318. Additionally, the biasing value (e.g., biasing threshold) created over the resistor 326 is the voltage value at the current terminal 340 of transistor 320. The biasing value (e.g., biasing threshold) is the voltage value at the gate of the transistor 318. Therefore, the biasing value may be set to any voltage value (e.g., 0.2 volts) so the transistor 318 conducts when there is a positive voltage drop (e.g., when the voltage at the current terminal 334 is 0.1 volts) between the gate terminal of transistor 318 and the current terminal 334.

The transistor 318 will conduct when the voltage drop between the gate of transistor 318 and the current terminal 334 is positive. Other examples disclosed herein include the transistor 318 conducting when the voltage at the current terminal 334 satisfies the biasing threshold. The biasing threshold may be satisfied when, for example, the voltage at the current terminal 334 is greater than, less than, or equal to the voltage at the gate of transistor 318. Two scenarios stem from the operation of this topology, (a) when transistor 318 is conducting (e.g., biasing threshold is satisfied) or (b) when the transistor 318 is blocking (e.g., not conducting or biasing threshold is not satisfied).

The transistor 318 may conduct when the voltage drop between the gate terminal of transistor 318 and the current terminal 334 is positive. For example, the transistor 318 may conduct when the gate voltage is 0.1 volts and the voltage at the current terminal 334 is 0 volts. In this example, the drain-to-source voltage drop is positive and the transistor 318 will conduct. Assuming the body diode voltage to be roughly 0.7 volts, the voltage at the transistor node in this scenario is approximately −0.7 volts (e.g., transistor node voltage (−0.7) volts plus body diode voltage (0.7) equals approximately 0 volts). This may occur during low side operation when the current flows through the ground node 110 in the converter 100. Additionally, when the transistor 318 conducts, the current over the example resistor 324 will conduct through the example transistor 318, thus causing the voltage at the fold-back signal node 328 to be relatively low.

The transistor 318 may block (e.g., block current from flowing through the current terminal 336 towards the current terminal 334) when the voltage drop between the gate terminal of transistor 318 and the current terminal 334 is negative. For example, the transistor 318 may block when the gate voltage is 0.1 volts and the voltage at the current terminal 334 is 0.2 volts. In this example, the drain-to-source voltage drop is negative and the transistor 318 will block. Assuming the body diode voltage to be roughly 0.7 volts, the voltage at the transistor node in this scenario is approximately −0.5 volts (e.g., transistor node voltage (−0.5) volts plus body diode voltage (0.7) equals approximately 0.2 volts). This may occur during low side operation when the current flows through the ground node 110 in the converter 100. Additionally, when the transistor 318 is blocking, the current over the example resistor 324 will conduct through the example buffer 312, thus causing the voltage at the fold-back signal node 328 to be relatively high.

When the magnitude of the voltage drop over the low-side transistor 104, governed by equation 1, is less than the body diode voltage on the transistor 316, the transistor 318 may not conduct. Likewise, when the magnitude of the voltage drop over the low-side transistor 104, governed by equation 1, is greater than or equal to the body diode voltage on the transistor 316, the transistor 318 may conduct. With respect to the elements in equation 1, changes in resistance ($R_{ON}$ or $R_{DS}$) may govern the voltage over the low-side transistor 104. An example in which the resistance of the low-side transistor changes is during a change in device temperature. For example, as temperature increases, resistance increases. Likewise, the state of the fold-back signal 310 changes and/or is determined in response to transistor node voltage, circuit temperature, etc.

The transistor 320 is coupled to the example transistor 318. In the example topology depicted in FIG. 3, since the gate voltages of transistors 318 and 320 are equivalent, the magnitude and polarity of the source voltage at the source terminals will determine which transistor turns on faster. The transistor 320 is an n-channel metal-oxide-semiconductor field-effect-transistor (NMOS). In other examples, the transistor 320 may be a bi-polar junction transistor, p-channel metal-oxide-semiconductor field-effect-transistor (PMOS), junction field-effect transistor (JFET), etc.

The example transistor 322 draws a voltage metric from the example buffer 314. The transistor 322 ensures the node shared by the current terminal 334 and the current terminal 332 will not drift up due to the leakage from transistor 316 when transistor 316 is off. This may occur when the transistor node 108 voltage is high. For example, the transistor 322 may configure the source voltage of the current terminal 332 to be equal to the gate voltage of the gate terminal of the transistor 316. This may ensure the transistor 316 is in saturation. The transistor 322 may an n-channel metal-oxide-semiconductor field-effect-transistor (NMOS), a bi-polar junction transistor, p-channel metal-oxide-semiconductor field-effect-transistor (PMOS), junction field-effect transistor (JFET), or any other device capable of configuring the transistor 316 to be in saturation.

Figure 4:
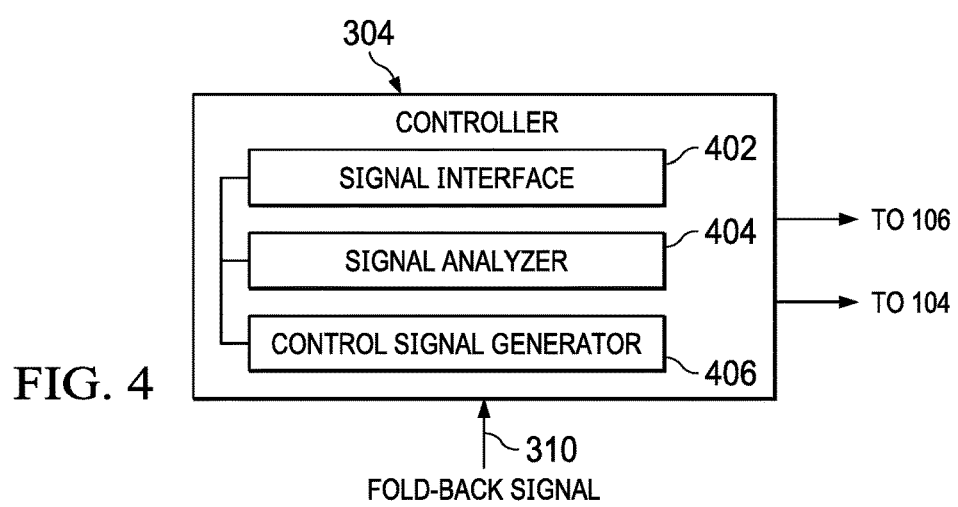
FIG. 4 is a block diagram illustrating an example controller used with the example fold-back circuit of FIG. 3.

FIG. 4 is a block diagram of an example controller 304 that may be used in combination the fold-back circuit 302. The example controller 304 includes a signal interface 402, a signal analyzer 404, and a control signal generator 406. The signal interface 402, signal analyzer 404, and control signal generator 406 are communicatively connected. For the purposes of driving the transistors 104, 106, the example controller 304 receives the fold-back signal 310 and produces two outputs that drive the transistors 104, 106, respectively. The number of inputs and produced outputs in the controller 304 may vary.

The example signal interface 402 receives the fold-back signal 310 from the fold-back circuit 302. The signal interface 402 communicates with the signal analyzer 404 and the control signal generator 406 to serve as a communication link.

The example signal analyzer 404 communicates with the signal interface 402 and the control signal generator 406. The signal analyzer 404 communicates with the signal interface 402 to determine if the fold-back signal 310 received at the signal interface 402 is high or low. Additionally, after determining if the fold-back signal 310 is high or low, the signal analyzer 404 communicates an indication of the result (e.g., whether the fold-back signal 310 is high or low) to the control signal generator 406. For example, if the signal analyzer 404 determines that the fold-back signal 310 is high, an indication of the high fold-back signal is communicated to the control signal generator 406. Likewise, if the signal analyzer 404 determines that the fold-back signal 310 is low, an indication the low fold-back signal 310 is communicated to the control signal generator 406.

The example control signal generator 406 communicates with the signal analyzer 404 to receive the indication of the result (e.g., whether the fold-back signal 310 is high or low). The control signal generator 406 generates a control signal in response to the indication of the result for the high-side transistor 106 and/or low-side transistor 104 to turn on and/or turn off the transistor. For example, if the control signal generator 406 receives an indication from the signal analyzer 404 of a low fold-back signal 310, the control signal generator 406 may generate a delayed signal corresponding to the turn on signal for the high-side transistor 106. Likewise, if the control signal generator 406 receives an indication from the signal analyzer 404 of a high fold-back signal 310, the control signal generator 406 may continue sending the turn on and/or off signal(s) to the low-side transistor 104 and/or the high-side transistor 106 as usual. In other examples, the polarity of the indication from the signal analyzer 404 may alter the actions of the control signal generator 406. In other examples, if the control signal generator 406 receives an indication from the signal analyzer 404 of a low fold-back signal 310, the control signal generator 406 may continue sending the turn on and/or off signal(s) to the low-side transistor 104 and/or the high-side transistor 106 as usual. Additionally, in other examples, if the control signal generator 406 receives an indication from the signal analyzer 404 of a high fold-back signal 310, the control signal generator 406 may generate a delayed signal corresponding to the turn on signal for the high-side transistor 106.

Figure 5:
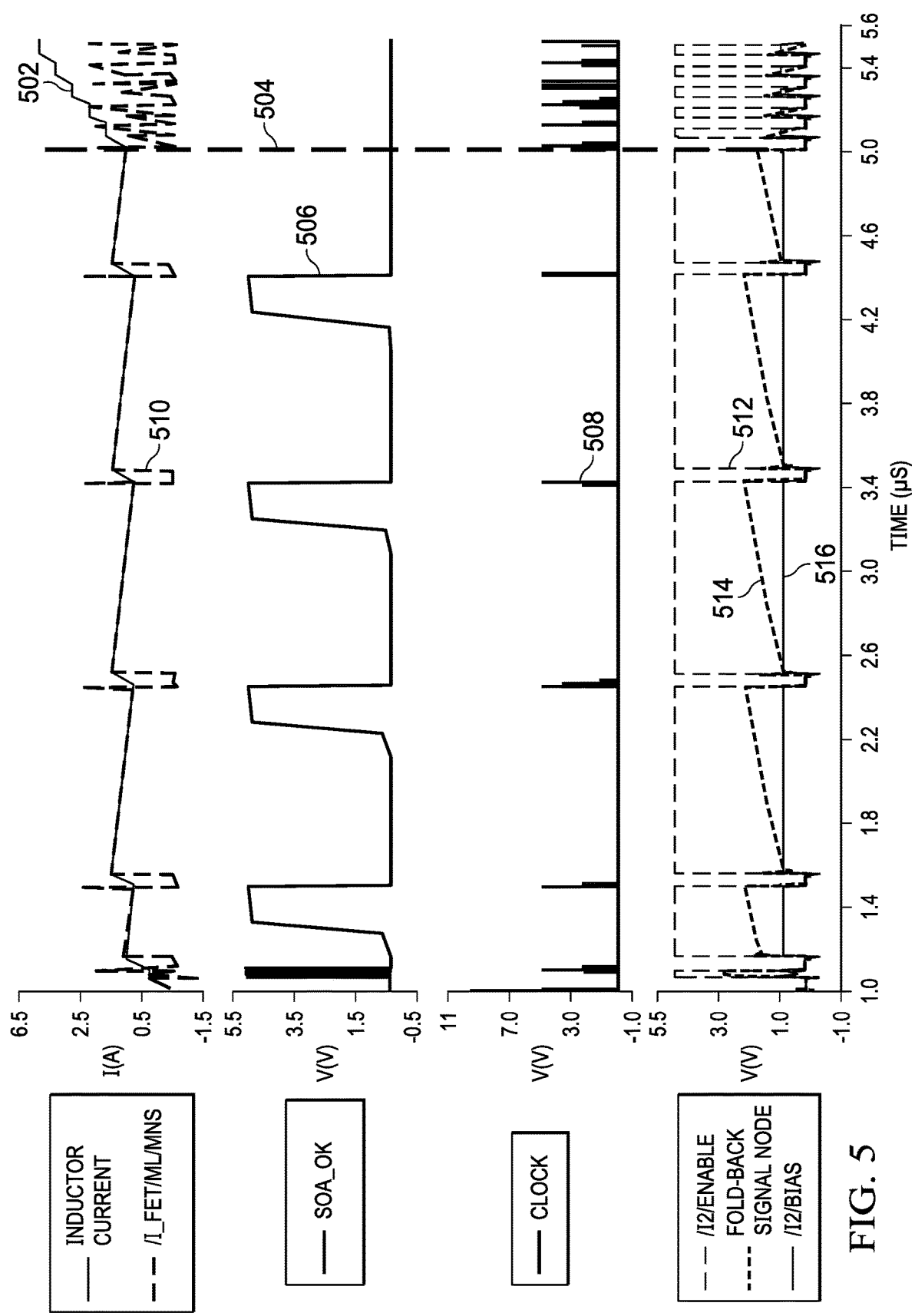
FIG. 5 is a graphical illustration of various signals of the example of FIG. 3 during operation and including a plot of the inductor current versus time without the use of the example fold-back circuit of FIG. 3.

FIG. 5 is a signal plot of the inductor current signal 502 when temperature increases and the example fold-back circuit 302 is disabled. The line 504 represents the time at which the temperature of the converter 100 grew from 125 degrees Celsius to 200 degrees Celsius. Shown clearly in the illustration, the inductor current signal 502 runs away after 5 μs, as shown at a line 504. The safe operating area indication signal 506 indicates whether or not the converter 100 is operating as desired. As temperature increases at line 504, during low-side operation (e.g., the low-side transistor 104 is conducting), the parasitic diodes of the low-side transistor 104 begin to carry significant current. As a result, the device monitoring the converter (e.g., a controller), loses the ability to properly monitor the inductor current signal 502. Therefore, the inductor current signal 502 runs away and is no longer properly controlled.

A clock 508 operates as normal, controlling the turn-on time of the high-side transistor 106. The lines 510 depict the minimum turn-on time of the high-side transistor 106. The enable signal 512 depicts the turn-on time of the low-side transistor 104 (e.g., when the enable signal 512 is high, the low-side transistor 104 is conducting). The fold-back signal 514 depicts whether the fold-back signal node 328 is high or low and the bias signal 516 depicts the amplitude of the biasing signal in the fold-back circuit 302.

Since the fold-back circuit 302 is disabled, as temperature increases in the converter 100, the device (e.g., a controller) controlling the converter 100 is no longer able to properly sense the inductor current 502. At line 504, the temperature of the converter 100 significantly increases (e.g., from 125 degrees Celsius to 200 degrees Celsius). Therefore, with the fold-back circuit 302 disabled, the enable signal 512 cannot be properly adjusted (e.g., delayed, etc., and the inductor current signal 502 runs away to unsafe conditions.

Figure 6:
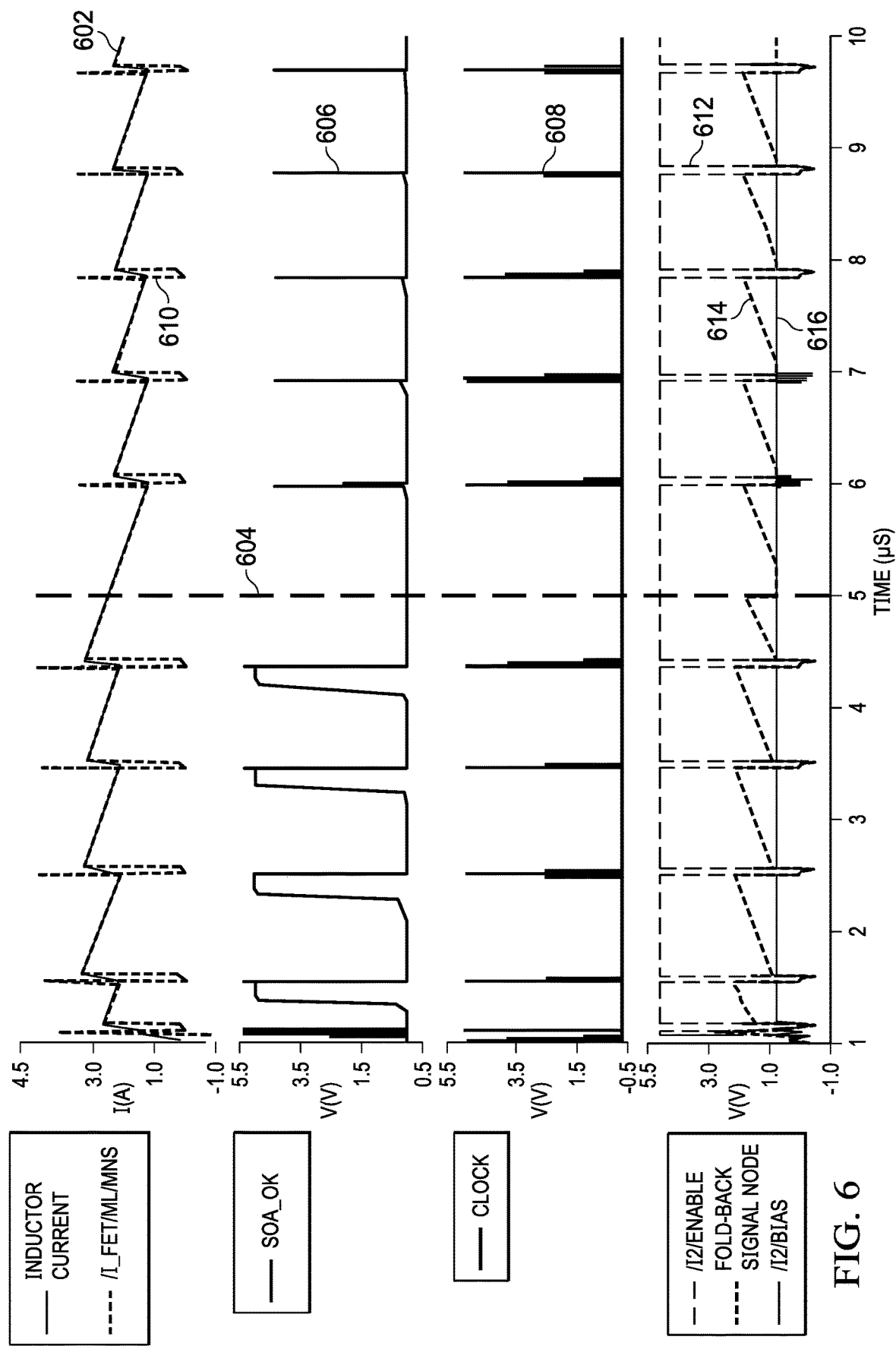
FIG. 6 is a graphical illustration of various signals of the example of FIG. 3 during operation and including a plot of the inductor current versus time with the use of the example fold-back circuit of FIG. 3.

FIG. 6 is a signal plot of the inductor current signal 602 when temperature increases and a fold-back circuit 302 is enabled. The line 604 represents the time at which the temperature of the converter 100 grew from 125 degrees Celsius to 200 degrees Celsius. Shown clearly in the illustration, the inductor current signal 602 maintains within the desired range, independent of an increase in temperature, as shown at a line 604. The safe operating area indication signal 606 indicates whether or not the converter 100 is operating as desired. As temperature increases at line 604, during low-side operation (e.g., the low-side transistor 104 is conducting), the parasitic diodes of the low-side transistor 104 begin to carry significant current. As a result, the device monitoring the converter (e.g., a controller), loses the ability to properly monitor the inductor current signal 602.

A clock 608 operates as normal, controlling the turn-on time of the high-side transistor 106. The lines 610 depict the minimum turn-on time of the high-side transistor 106. The enable signal 612 depicts the turn-on time of the low-side transistor 104 (e.g., when the enable signal 612 is high, the low-side transistor 104 is conducting). The fold-back signal 614 depicts whether the fold-back signal node 328 is high or low and the bias signal 616 depicts the amplitude of the biasing signal in the fold-back circuit 302.

Since the fold-back circuit 302 is enabled, as temperature increases in the converter 100, the device (e.g., controller) controlling the converter 100 is no longer able to properly sense the inductor current 602. At line 604, the temperature of the converter 100 significantly increases (e.g., from 125 degrees Celsius to 200 degrees Celsius). Therefore, with the fold-back circuit 302 enabled, turn on time of the high-side transistor 106 is delayed (e.g., the enable signal 612 is high until the converter 100 returns to safe operating conditions). The enable signal 612 remains high until the safe operating area indication signal 606 is high. In the example illustrated in FIG. 6, the inductor current signal 602 no longer runs away.

While an example manner of implementing the controller of FIGS. 3 and 4 is illustrated in FIG. 3, one or more of the elements, processes and/or devices illustrated in FIG. 3 may be combined, divided, re-arranged, omitted, eliminated and/or implemented in any other way. Further, the example signal interface 402, the example signal analyzer 404, the example control signal generator 406, the example fold-back circuit 302, the example current mirror 308, and/or, more generally, the example controller 304 of FIGS. 3 and 4 may be implemented by hardware, software, firmware and/or any combination of hardware, software and/or firmware. Thus, for example, any of the example the example signal interface 402, the example signal analyzer 404, the example control signal generator 406, the example fold-back circuit 302, the example current mirror 308 and/or, more generally, the example controller 304 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal interface 402, the example signal analyzer 404, the example control signal generator 406, the example fold-back circuit 302, the example current mirror 308 and/or, the example controller 304 is/are hereby expressly defined to include a non-transitory computer readable storage device or storage disk such as a memory, a digital versatile disk (DVD), a compact disk (CD), a Blu-ray disk, etc. including the software and/or firmware.

Further still, the example controller of FIG. 4 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
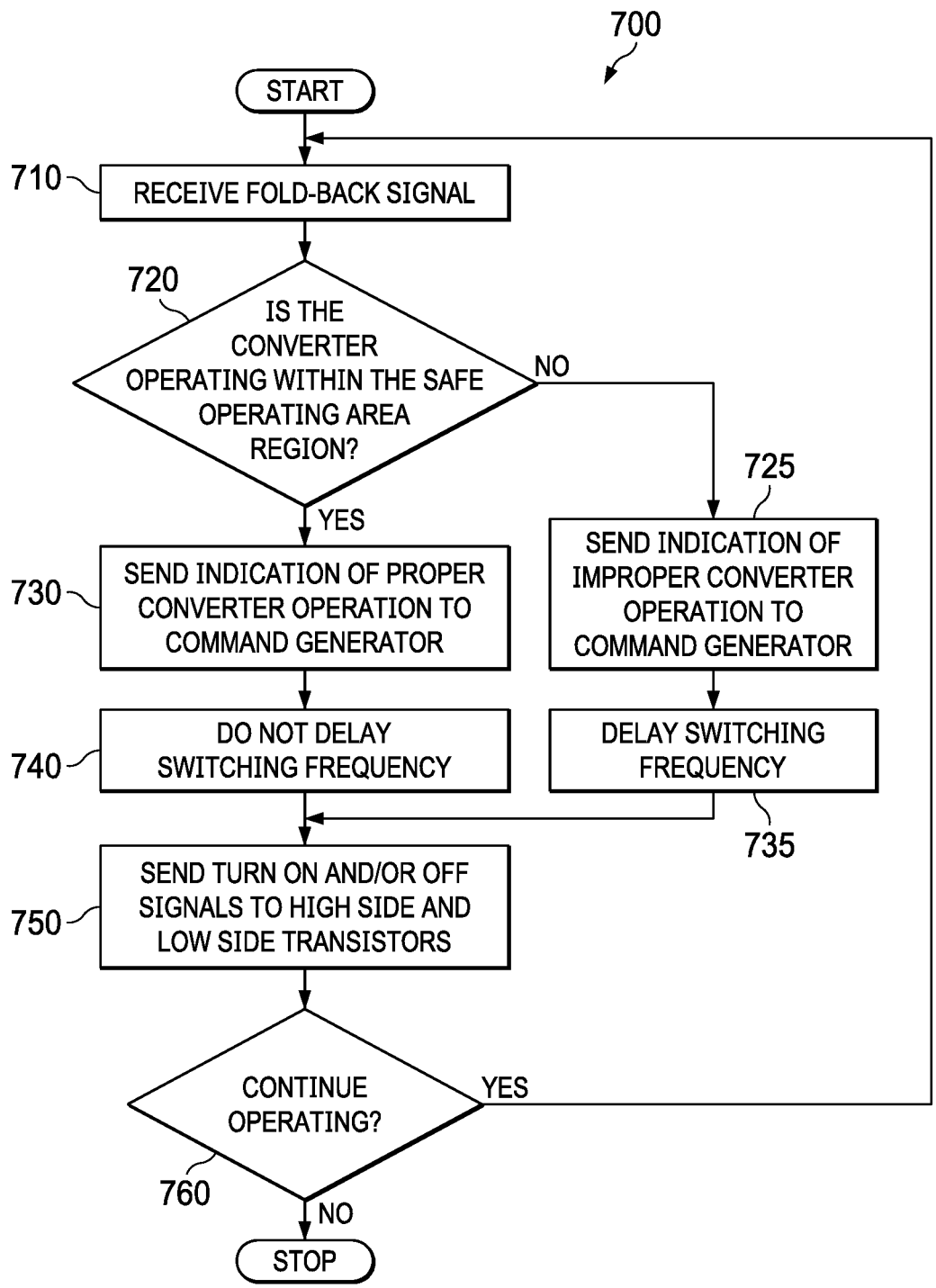
FIG. 7 is a flowchart representative of machine readable instructions that may be executed to implement the controller of FIG. 3 or 4.

A flowchart representative of example hardware logic, machine readable instructions, hardware implemented state machines, and/or any combination thereof for implementing the controller of FIGS. 3 and 4 is shown in FIG. 7. The machine readable instructions may be an executable program or portion of an executable program for execution by a computer processor such as the processor 812 shown in the example processor platform 800 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example controller may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 7 is a flowchart 700 representative of machine readable instructions that may be executed to implement the controller of FIG. 3 or 4. The signal interface 402 receives the fold-back signal 310 from the fold-back circuit 302 in response to a threshold met (e.g., the threshold is satisfied) in the fold-back circuit 302 (Block 710).

After the signal interface 402 receives the fold-back signal 310, the signal analyzer 404 determines, based on the fold-back signal 310, if the converter is operating within the safe operating area region (Block 720). An indication of improper operation is sent to the control signal generator 406 if the signal analyzer 404 determines the converter is no longer operating within the safe operating area region. (Block 725). The indication is, for example, a signal to the control signal generator 406 to implement a delay for the low-side transistor 104 and/or the high-side transistor 106. The control signal generator 406 will delay the switching frequency of the low-side transistor 104 and/or high-side transistor 106 (Block 735).

An indication of proper operation is sent to the control signal generator 406 if the signal analyzer 404 determines the converter is operating within the safe operating area region. (Block 730). The indication is, for example, a signal to the control signal generator 406 to continue operation as previously planned (e.g., do not implement a delay for the low-side transistor 104 and/or the high-side transistor 106). The control signal generator 406 will not delay the switching frequency of low-side transistor 104 and/or high-side transistor 106 (Block 740).

The control signal generator 406 sends the newly delayed and/or non-delayed signals to the high-side transistor 106 and/or low-side transistor 104 (Block 750). For example, the control signal generator 406 may delay the turn on time of the high-side transistor 106 if an indication is received from the signal analyzer 404 of improper operating conditions. Likewise, the control signal generator 406 may continue operating as before if an indication is received from the signal analyzer 404 of proper operating conditions.

The controller 304 determines whether or not to continue operating (Block 760). Instances where the process ceases to continue include loss of power, unexpected damage to various components or device malfunction. If the process is to continue, the signal interface 402 will receive the fold-back signal 310 for the next clock cycle (Block 710).

Figure 8:
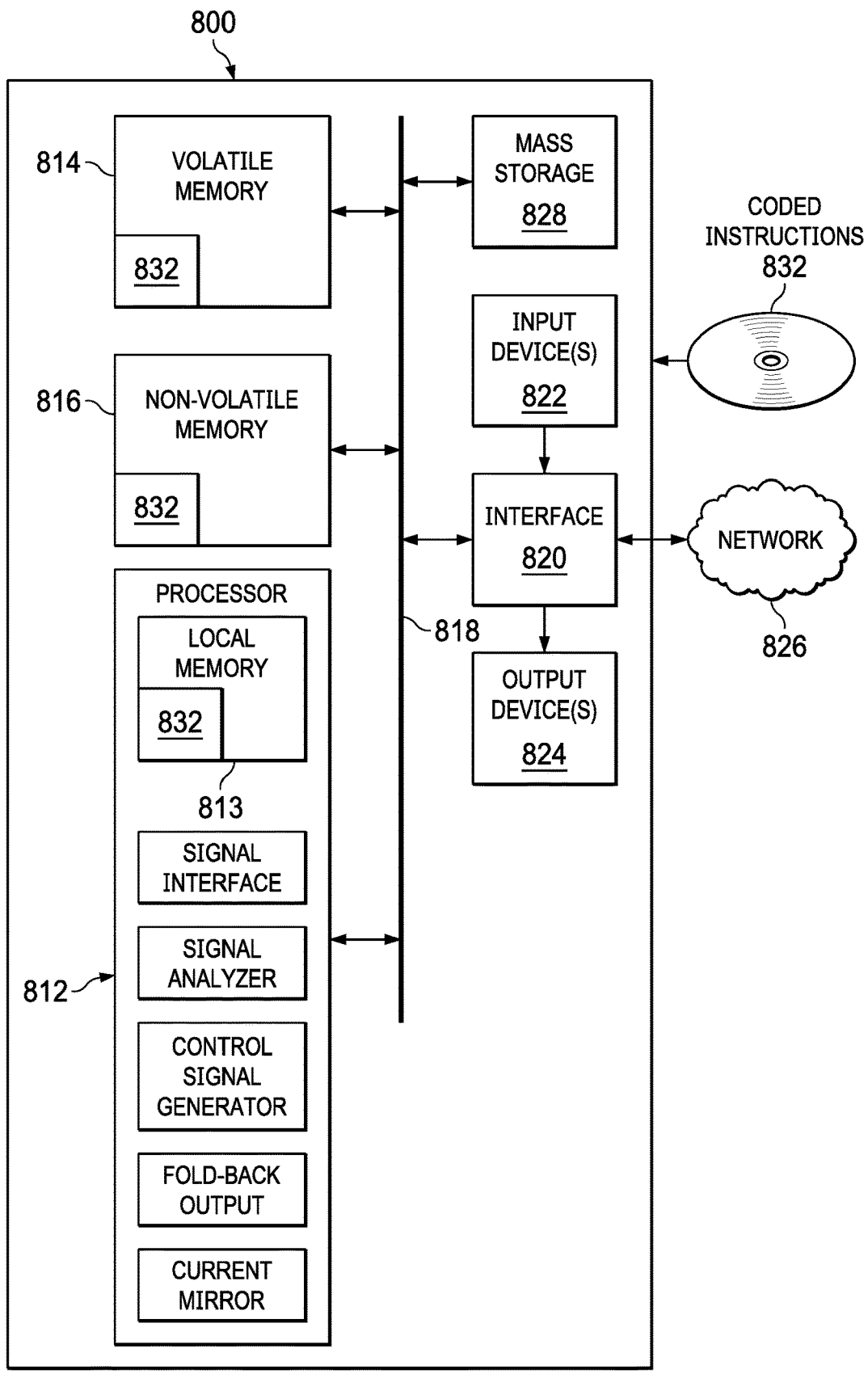
FIG. 8 is a block diagram of an example processor platform 800 structured to execute the instructions of FIG. 7 to implement the controller or fold-back circuit of FIGS. 3 and 4.

FIG. 8 is a block diagram of an example processor platform 800 structured to execute the instructions of FIG. 7 to implement the controller or fold-back circuit of FIGS. 3 and 4. The processor platform 800 can be, for example, a server, a personal computer, a workstation, a self-learning machine (e.g., a neural network), an automobile computer system, manufacturing equipment, industrial power supplies, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements, the example signal interface 402, the example signal analyzer 404, the example control signal generator 406, the example fold-back circuit 302, and/or the example current mirror 308.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, power converter and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that allow for properly sized switches and/or transistors in converters. The example methods, apparatus and articles of manufacture no longer contain over-sized and/or over compensated components to operate in safe conditions. The disclosed methods, apparatus and articles of manufacture improve the efficiency of using a computing device by increasing the safe operating area of and allowing devices to operate at their full constraints. Furthermore, the disclosed methods, apparatus and articles of manufacture improve the ability to use a power converter to power a load, such as automobile electronic equipment, manufacturing equipment or industrial sector equipment, and maintain within the safe operating area of the power converter. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a current mirror directly connected to a source voltage and directly coupled to a controller;
a first transistor including a first gate, a first current terminal, and a second current terminal, the first current terminal directly connected to the current mirror and the second current terminal is operable to be directly connected to a converter; and
a second transistor including a second gate, a third current terminal, and a fourth current terminal, the second gate is directly coupled to the first gate and the first current terminal, the third current terminal is directly coupled to the controller, and wherein the fourth current terminal is directly coupled to the second gate and the first gate.

2. The apparatus of claim 1, wherein the converter includes a switched mode power supply.

3. The apparatus of claim 1, wherein the second current terminal of the first transistor is configured to be coupled to a transistor node of the converter to obtain a first signal.

4. The apparatus of claim 3, wherein the first signal is a function of a transistor node voltage.

5. The apparatus of claim 4, wherein the first signal is to be summed with a diode voltage, wherein the diode voltage is to be established across the first current terminal and the second current terminal of the first transistor.

6. The apparatus of claim 1, wherein the controller includes a signal interface, a signal analyzer, and a control signal generator, the controller is to output a delayed signal corresponding to a turn-on time for a third transistor in the converter.

7. The apparatus of claim 1, wherein the current mirror further includes a third transistor, wherein the third transistor includes a third gate, fifth current terminal, and sixth current terminal.

8. The apparatus of claim 7, wherein the fifth current terminal is coupled to the first current terminal, the sixth current terminal is configured to be coupled to the controller.

9. A system including a converter having a switching transistor, a source voltage, a fold-back circuit and a controller operable to control the switching transistor, the fold-back circuit comprising:
a first transistor having a first gate, a first current terminal and a second current terminal operable to be directly connected to a current terminal of the switching transistor;
a second transistor having a second gate, a third current terminal and a fourth current terminal, the second gate connected to the first gate, the first current terminal and the fourth current terminal and the third current terminal is operable to be connected to the controller through a buffer; and
a current mirror directly connected to the first current terminal and the third current terminal, the current mirror is operable to be directly connected to the source voltage.

10. The system of claim 9, wherein the converter includes a switched mode power supply.

11. The system of claim 9, wherein the controller includes a signal interface, a signal analyzer, and a control signal generator, the controller is to output a delayed signal corresponding to a turn-on time for the switching transistor.

12. A voltage converter having an input voltage and an output voltage coupled to a load, the voltage converter comprising:
a high-side transistor having a first control terminal, a first current terminal coupled to the input voltage and a second current terminal;
a low-side transistor having a second control terminal and a third current terminal coupled to the second current terminal;
a controller having a first output coupled to the first control terminal and a second output coupled to the second control terminal;
a first transistor having a third control terminal, a fourth current terminal and a fifth current terminal, the fourth current terminal is directly coupled to the third current terminal;
a second transistor having a fourth control terminal, a sixth current terminal and a seventh current terminal, the third control terminal and the fourth control terminal are directly coupled to the fifth current terminal and the sixth current terminal; and
a current mirror having a first terminal and a second terminal, the first terminal directly coupled to the third control terminal and the fourth control terminal and the second terminal is coupled to the controller and the second control terminal.

13. The voltage converter of claim 12, wherein the second terminal is directly coupled to the second control terminal.

14. The voltage converter of claim 13, wherein the second terminal is directly coupled to the controller through a resistor and a buffer.

15. The voltage converter of claim 12, wherein the current mirror further includes a third terminal coupled to the second terminal.

* * * * *